Aug. 27, 1968  H. S. BELSON  3,399,361
VARIABLE DELAY LINE
Filed July 24, 1963
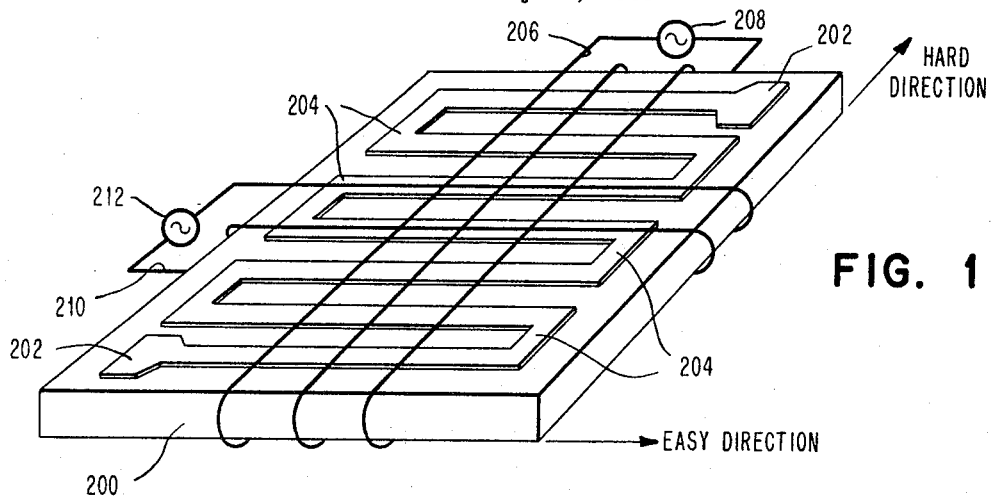
FIG. 1
FIG. 2
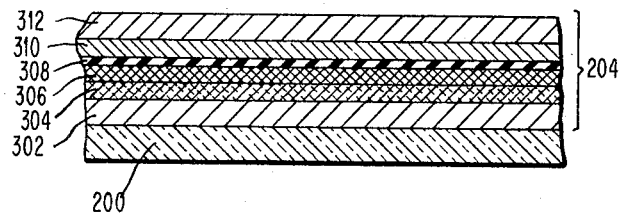
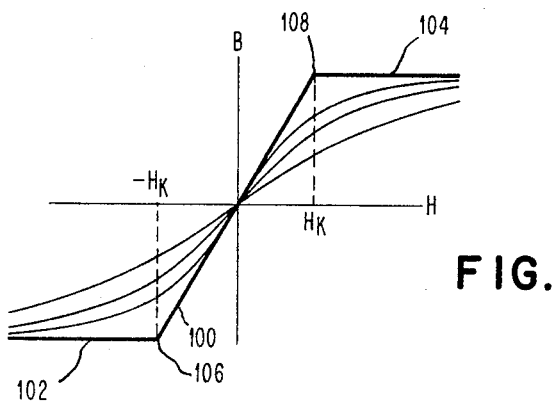
FIG. 3
INVENTOR
HENRY S. BELSON
BY *J. Donald Weber, Jr.*
AGENT

United States Patent Office 3,399,361
Patented Aug. 27, 1968

3,399,361
VARIABLE DELAY LINE
Henry S. Belson, North Hills, Pa., assignor to Sperry Rand Corporation, New York, N.Y., a corporation of Delaware
Filed July 24, 1963, Ser. No. 297,320
2 Claims. (Cl. 333—31)

This invention relates to a variable delay line. In particular, the delay line is produced by providing a magnetic material having a selectively high permeability between the parallel strip conductors of a transmission line and providing a magnetic field applying means adjacent thereto for selectively varying the permeability of said magnetic material.

It is well known that the speed (V) of electromagnetic wave propagation in a transmission line is inversely proportional to the square root of the permeability ($\mu$) and the dielectric constant (or permittivity, $\epsilon$) of the material between the conductors of the transmission line. Thus, $V=1/\sqrt{\mu\epsilon}$.

It is clear, therefore, that increasing the permeability or the permittivity of the dielectric material in a transmission line is effective to vary the speed of propagation of electromagnetic waves therealong. By changing the speed of propagation of electromagnetic waves such that the speed is decreased, a delay line is effected. The specific delay period, $t$, is a function of the velocity of the electromagnetic wave propagation and the length of the transmission line. Thus, $t=L\sqrt{\mu\epsilon}$.

One means for decreasing the speed of the wave propagation is to increase the permeability of the spacer material between the conductors of the transmission line. An ideal material for this purpose is a magnetic material having a uniaxial magnetic anisotropy and characterized by HARD and EASY magnetization directions or axes, as is known in the art. This type of magnetic material, normally in the form of a thin film, may be oriented such that the flux lines produced by the electromagnetic wave pass therethrough in the HARD magnetization direction. In this condition, the delay line is relatively lossless inasmuch as the hysteresis characteristic for the thin film is a substantially linear one. That is, there are no hysteresis losses incurred therein. Moreover, by utilizing a thin magnetic film such as that described the permeability therein in the HARD direction may be approximately 10,000 times the permeability of air. The particular type of film utilized may be varied in accordance with the method of deposition desired or by other preferred manufacturing methods. A typical thin film which provides the necessary characteristics is Permalloy or virtually any other magnetic film having the 80% Fe, 20% Ni formulation. This type of delay line is described in a copending application entitled Delay Line, by P. G. Kornreich, which was filed on Dec. 11, 1961, and bears Ser. No. 158,249, now Patent No. 3,257,629, and was assigned to the assignee of this application. By providing a means, for example a coil wound around the transmission line, to supply a controllable external magnetic field to the magnetic material, the permeability thereof may be controlled. This control of the permeability of the magnetic material permits control of the delay time of the delay line.

Clearly, one object of this invention is to provide a variable delay line.

Another object of this invention is to provide a variable delay time in a relatively small physical size whereby ohmic losses are reduced.

Another object of this invention is to provide a delay line wherein the delay per unit length may be varied with ease.

Another object of this invention is to provide a delay line utilizing a thin magnetic film having a large permeability as part of the spacer material between the conductors of a transmission line and a magnetic field applying means for changing the permeability of the film.

These and other objects of this invention will become more readily apparent subsequent to a reading of the following description in conjunction with the accompanying drawings in which:

FIGURE 1 is an isometric view of one embodiment of the invention showing a preferred configuration;

FIGURE 2 is a cross sectional view of a portion of the delay line configuration shown in FIGURE 1; and FIGURE 3 is a graphical representation of a family of hysteresis characteristics for the dielectric magnetic film when subjected to different external fields.

Referring now to FIGURE 1 there is shown a preferred embodiment of the invention. It is to be understood that the embodiment shown in FIGURE 1 is not meant to be limitative of the invention but is merely illustrative thereof. In FIGURE 1 the delay line is shown mounted on a base 200. The base 200 may represent, for example, a glass substrate, or the like, upon which the delay line is mounted. In the alternative, the base 200 may represent a ground plane for the transmission line. In any event, the base 200 is utilized primarily to support the transmission-line delay-line. At either end of the delay-line, there are shown terminals 202. These terminals may represent input or output terminals much the same as are utilized in printed circuit applications. Between the input and/or output terminals 202, there is connected the transmission line which forms the delay line. This transmission line comprises at least a pair of electrical conductors and spacer material therebetween which spacer material comprises a thin magnetic layer and an insulating layer. This magnetic layer is characterized by uniaxial anisotropy and HARD and EASY directions as shown. A detailed view of the construction of the transmission line is shown in FIGURE 2.

Referring now to FIGURE 2, there is shown a cross-sectional view of the transmission-line delay-line. This delay line is more fully described in the above-identified copending application. A brief description is presented for purposes of clarity. Base 200 may comprise any suitable substrate material as for example glass. In the alternative, base 200 may represent the ground plane conductor since it is utilized primarily for support purposes. In the event that the base 200 is a substrate material, a first conductor 302 is mounted thereon. Conductor 302 may be a strip of copper which is mounted on base 200 by any suitable deposition method and typically has a thickness of 30,000 A., or more. Layer 304 represents a bonding layer of chromium or aluminum on the order of 100–300 A. thick and may be eliminated in many cases.

Similarly, layer 306 represents a layer of gold on the order of 100–300 A. thick which provides a better bonding surface. Again, this layer may be eliminated in some production processes. Layer 308 is an insulation layer the thickness of which may vary between 500–10,000 A. This insulation layer may be any of the known types of layers as for example SiO, or $Al_2O_3$. This insulating layer is utilized to eliminate the electrical contact between the two conductors of the transmission line. Also, large variations in insulation thickness may be used to vary the impedance of the line since the impedance of the transmission line is a function of the dimensions of the line; viz., $$Z=\frac{a}{b}\sqrt{\mu/\epsilon}$$

where $a$ is the space between the conductors; $b$ is the width of the conductors; and $\mu$ and $\epsilon$ are the permeability and permittivity respectively. Layer 310 represents the thin magnetic film which is utilized in the fabrication of the transmission-line delay-line and exhibits uniaxial anisotropy and is characterized by HARD and EASY magnetization directions as are now known in the art. Typical films are permalloy or virtually any 80% Fe, 20% Ni class of film. The magnetic layer is preferably similar in thickness to the insulation layer 308. Finally, layer 312 is representative of the second conductor in the transmission line and again may be a 30,000 A, (or more) strip of suitable conducting material, as for example, copper.

As shown in FIGURE 1, the transmission line 204 follows a zig-zag path between the input and/or output terminals 202. Of course, the conductor 204 need not follow the zig-zag path but in the event that a long delay period is desired this zig-zag path provides a more compact delay line element. The delay line element provides a substantially constant delay period. By providing external means for varying the magnetic field applied to the element and to the magnetic layer in particular, variations in the delay produced by the delay line may be obtained. The means for varying the magnetic field may be of any desirable type, as for example an electromagnet, a permanent magnet, or the like. A preferred embodiment is shown in FIGURE 1. In this embodiment, coil 206 surrounds the delay element along one axis, viz. parallel to the HARD magnetization direction. Although coil 206 is shown as having only a few turns, it is important that sufficient turns be provided to create a substantially uniform magnetic field at the magnetic layer. This coil is connected to current generator or source 208 which may be any type of generator capable of supplying current to coil 206 in order to produce a magnetic field therearound. By the well known "right-hand" convention, it is obvious that the magnetic field produced by coil 206 is along the EASY axis of the film.

In typical operation, signal current is applied to the circuit via one of the terminals 202 and withdrawn from the circuit by the other of the terminals 202. The signal current follows the path of the conductor 204. By the same "right-hand" convention, it will be seen that as the signal current flows through the conductors 204, a flux path, which encircles the conductor, is produced. This flux path links the thin magnetic film, which is part of the spacer between the conductors of the transmission line, in the HARD direction whereby the thin magnetic film assumes the basic characteristic shown in FIGURE 3.

Referring now to FIGURE 3, there is shown an illustrative family of hysteresis characteristics for a thin magnetic film having uniaxial magnetic anisotropy. This family of hysteresis characteristics (not necessarily to scale) is exhibited when the film is oriented such that the flux lines linked thereto are substantially in the HARD direction. It will be seen, that the basic hysteresis characteristic is a substantially linear one. The characteristic is comprised substantially of three important portions or areas of operation. Portion 100 (the slope portion of the characteristic) represents the unsaturated condition of the thin magnetic film. That is, the magnetization vector of the thin magnetic film (assumed to be a single domain) is free to rotate. Portions 102 and 104 of the characteristic represent the saturated regions of the film. That is, when the film is operating in portion 102 or 104 the magnetization vector of the magnetic film is aligned in the HARD direction and the application of further fields will not effect further rotation of the vector. The remaining curves have similar operating regions. However, because of the configuration of the curve, these regions are less pronounced.

Experimental evidence has indicated that while operating in portion 100 the relative permeability of the film is approximately 10,000 times that of air. Thus effectively, the relative permeability of the unsaturated film when flux is linked thereto in the HARD direction is about 10,000. Of course, the permeability of the overall spacer material is less because of the effect of the insulation layer. The relative permeabiliity of the film when operating in the saturated regions represented by portions 102 and 104 is substantially the same as permeability of air. That is, the effective relative permeability of the film in the saturated condition is about 1.0000. Clearly, in order to effect the desired result the film must be operated in the region designated by portion 100 or the unsaturated region. That, is, the film must operate between the breakpoints of the curve which represents the anisotrophy field constant, $H_k$, of the film.

By changing the magnitude of the "bias" current supplied by source 208, the magnitude of the field produced thereby is changed. The change in the field applied by coil 206 produces a change in the velocity of propagation along the transmission line and, thus, a change in the delay of the delay element. The change in delay is produced by changing the permability of the film, in the HARD direction. The permeability change is brought about by applying a magnetic field to the film in the EASY direction by means of coil 206. This may be described as strengthening the magnetic field which aligns the magnetic vector M, in the EASY direction of the film. In other words, the signal field produced by the signal curent encounters greater resistance to the rotation of the vector M thereby. Therefore, since the vector M rotates less freely, there is less flux generated in the thin film such that the permeability thereof is less. This may be shown by considering the following equation which is a valid approximation for small signal fields:

$$\mu_H = \frac{M}{2K_A/M + H_E}$$

where $\mu_H$ is the film permeability in the HARD direction; $K_A$ is the anisotropy constant for the film; $H_E$ is the signal field applied in the EASY direction; and M is the magnetic moment.

In accordance with the equations given earlier, a change in the permeability produces a change in the velocity (or delay) of signal propagation along the line. Similarly, the equation noted immediately above defines how the permeability changes in response to a change in the magnetic field applied. This is graphically shown in FIGURE 3. From these equations it can be determined what change is produced in the delay period for a change in the applied field.

In order to provide more latitude or flexibility in the selection of the amount of delay created in the element, a composite field may be applied. That is, fields may be applied in the EASY and HARD magnetic directions. Thus, coil 210 surrounds the delay element in the same manner as coil 206 with the exception that the coils are orthogonal. Generator 212, which is similar to generator 208, is connected to coil 210 to produce a current therethrough and, thus, a magnetic field therearound. The field produced by coil 200 is orthogonal to the field produced by coil 206 and has different effects on the magnetic film. For example, if the field $H_H$ applied by coil 210 in the HARD direction is sufficient to saturate the field, the permeability of the film becomes approximately that of air because the field created by the signal current produces no corresponding change of flux in the film. At the other extreme, no field is applied by the coil 210 such that the signal current encounters the high permeability of the thin magnetic film.

The variations in the permeability are shown in FIGURE 3, which is a family of permeability curves. The different slopes of the different curves represents the permeabilities of the film in the HARD direction. The permeability may be computed by the following approximation equation:

$$\mu_H = \frac{M}{2K_A/M + H_E/\cos\phi}$$

where $\cos\phi$ is the angle between the magnetization vector

M and the EASY direction, and the other symbols are previously defined.

It is to be understood, of course, that the preferred fabrication of the transmission line is not limitative of the invention. Rather, this construction is illustrative only and certain modifications, as suggested supra, may be made as for example certain layers may be added or eliminated. Moreover, an electromagnet or a permanent magnet may be substituted for coils 206 and 210 in order to provide the magnetic field to be applied to the delay element.

It is clear, that the principles and scope of the invention are not limited to those discussed herein. That is, variations on the embodiments suggested may become apparent to those skilled in the art. However, the invention is meant to include such variations in the embodiment which utilize principles of the inventive concepts set forth.

The embodiments of the invention in which an exclusive property or privilege is claimed are defined as follows:

1. A variable delay line comprising,
    (a) a first conductor having a length and width dimension;
    (b) a second conductor having a length and width dimension and oriented with respect to said first conductor to provide a transmission effect, said conductors being oriented in a zig-zag configuration so that sections thereof are arranged in parallel fashion with other sections wherein a majority of said parallel sections are of longer length than the remaining sections;
    (c) a spacer positioned between said conductors, said spacer further including a thin magnetic film having the approximate proportions of 80% Fe and 20% Ni, said film further being characterized by the property of uniaxial anisotropy whereby an EASY axis is induced in said film, said EASY axis being oriented along said length dimension of said longer parallel sections;
    (d) input means adapted to supply current to said conductors such that a magnetic field links said film in the HARD axis;
    (e) output means adapted to provide outputs subsequent to the application of inputs at said input means;
    (f) first external means juxtaposed to said longer parallel sections for generating a magnetic field in the direction of said EASY axis of said longer parallel section;
    (g) second external means juxtaposed to said longer parallel sections for generating a magnetic field in the direction of said HARD axis of said longer parallel section, said first and second external means being applied singly or together to form a variable delay line by varying the permeability of said film from approximately 1 to approximately 10,000.

2. A variable delay line in accordance with claim 1 wherein said first external means comprises a coil which is oriented orthogonally to said longer parallel sections, and said second external means comprises a coil which is oriented parallel to said longer parallel sections.

References Cited

UNITED STATES PATENTS

| | | | |
|---|---|---|---|
| 3,145,372 | 8/1964 | Suits et al. | 307—88.5 |
| 3,247,470 | 4/1966 | Read | 307—88.5 |
| 3,257,629 | 6/1966 | Kornreich | 333—31 |

OTHER REFERENCES

Electronics, Measuring Switching Speed of Magnetic Films; June 3, 1960, pp. 79–81, copy in 333–11.

IBM Technical Disclosure Bulletin, Non-Linear controllable Transmission Lines, vol. 2, No. 6, Apr. 1960, pp. 108, 109, copy in 333–11.

Kornreich et al.: Journal of Applied Physics, vol. 34, No. 4 (Part 2) Apr. 1963, pp. 1169, 1170.

ELI LIEBERMAN, *Primary Examiner.*